L. J. ANNES.
Buggy-Seat.
No. 211,878. Patented Feb. 4, 1879.
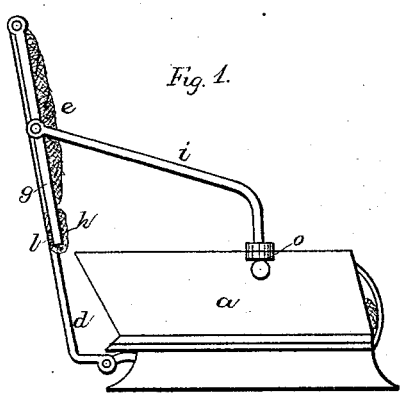
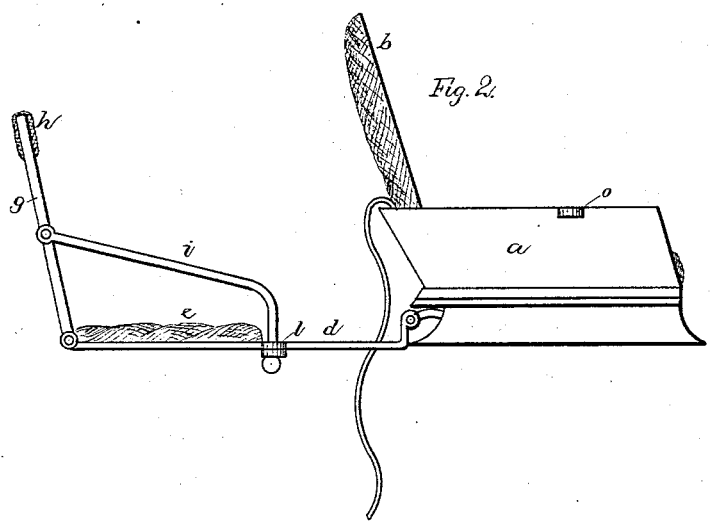
Witnesses:
J. W. Garner
H. S. D. Haines
Inventor:
L. J. Annes
per
F. A. Lehmann,
Atty

UNITED STATES PATENT OFFICE.

LORENZO J. ANNES, OF AMADORE, MICHIGAN.

IMPROVEMENT IN BUGGY-SEATS.

Specification forming part of Letters Patent No. 211,878, dated February 4, 1879; application filed December 12, 1878.

*To all whom it may concern:*

Be it known that I, LORENZO J. ANNES, of Amadore, in the county of Sanilac and State of Michigan, have invented certain new and useful Improvements in Buggy-Seats; and I do hereby declare the following to be a full, clear, and exact description of the invention, such as will enable others skilled in the art to which it pertains to make and use it, reference being had to the accompanying drawings, which form part of this specification.

My invention relates to an improvement in seats for vehicles; and it consists in providing the stationary seat with two hinged backs, one of which is hinged to the bottom of the seat, and is only brought into play when the second back is thrown back to form a second seat. By the use of the two backs, when two seats are formed each one has its own back.

Figure 1 is a side elevation of my seat when the parts are folded up so as to form but a single seat. Fig. 2 is a side elevation of the same when the said parts are extended so as to form two seats.

$a$ represents an ordinary seat, such as is used in buggies and vehicles of different kinds. Hinged to the top of this seat $a$ by means of any suitable devices is the back $b$, which, when the parts are all folded together so as to form but a single seat, is folded down on top of the cushion on the seat, and held in that position by means of straps $c$. This back $b$ is padded as much on one side as the other, for when thus strapped down upon the top of the cushion it forms the cushion upon which the persons sit.

Hinged to the back lower edge of the seat $a$ by means of the rods $d$ is the padded part $e$, which forms the back for the seat $a$ when the parts are all folded together, as shown in Fig. 1. The part $e$ consists of a suitable strong frame, padded on its front or upper side, so that when extended it forms a second seat. Pivoted to the upper or outer corners of the part $e$ is the metallic frame $g$, having the padded part $h$. Pivoted to this frame $g$ are the two arms $i$, which form the side arms for the seat $a$ when the parts are all folded together, and the arms for the second seat $e$ when the parts are extended.

When but a single seat is wanted, the back $b$ is strapped or otherwise fastened down upon the cushion, and the part $e$ is raised so as to form a back for the seat $a$. While the part $e$ is forming a back the metallic frame $g$ drops down in line with it, and the padded part $h$ comes just over the rear top edge of the seat, so as to form a part of the back, and the lower front ends of the arms $i$ pass down through the eyes $o$ on the sides of the seat $a$, where they are securely held by means of nuts or other suitable fastenings. The back $b$ can be entirely dispensed with, if so desired. When two seats are needed, the arms $i$ are loosened from the eyes, the part $e$, which just formed the back, is laid straight back, the frame $g$ is raised upward, so that the part $h$ now forms a back, and the lower front ends of the arms $i$ are passed through the eyes $l$ in the rods, which project out from the sides of the rods $d$. This additional seat is very light, and can be added at but little cost to any of the seats now in use.

I am aware that a hinged back that is capable of being used as a second seat is not new.

Having thus described my invention, I claim—

1. A seat, $a$, having the permanent hinged back $b$ and a hinged back, $e$, that can be formed into a second seat, substantially as set forth.

2. The combination of the seat $a$, provided with the back $b$, that is hinged to its bottom, and only brought into use when a second seat is formed, hinged rods $d$, having the part $e$ secured to them, frame $g$ $h$, arms $i$, and eyes to fasten them in, substantially as set forth.

In testimony that I claim the foregoing I have hereunto set my hand this 30th day of November, 1878.

LORENZO JORDAN ANNES.

Witnesses:
JOHN McGILL,
GEORGE E. McGILL.